United States Patent [19]

Yellin et al.

[11] Patent Number: 4,560,600

[45] Date of Patent: Dec. 24, 1985

[54] CONTINUOUS FORMS FOR MAKING INDEXES

[76] Inventors: Jacob A. Yellin, 405 Davis Ct. #908, San Francisco, Calif. 94111; Richard N. Koss, 2130 Cedar St., San Carlos, Calif. 94070

[21] Appl. No.: 658,141

[22] Filed: Oct. 4, 1984

[51] Int. Cl.[4] .......................... B32B 3/24; B42F 21/12

[52] U.S. Cl. ...................................... 428/43; 428/131; 282/12 A; 283/37; 283/39; 283/41; 40/360; 206/390

[58] Field of Search ............... 428/43, 131; 282/12 A, 282/11.5 R; 283/37–41; 40/360; 206/390

[56] References Cited

U.S. PATENT DOCUMENTS

| | | | |
|---|---|---|---|
| 2,087,144 | 7/1937 | Hano | 282/12 A |
| 2,246,042 | 6/1941 | Hall et al. | 282/11.5 R |
| 4,178,018 | 12/1979 | Halse | 282/12 A |

*Primary Examiner*—Alexander S. Thomas

*Attorney, Agent, or Firm*—Majestic, Gallagher, Parsons & Siebert

[57] ABSTRACT

A continuous form for making one or more index sheets comprises an elongated strip of material perforated along a first line or a first set of lines transverse to the length of the strip. When the strip is split along the first set of lines a plurality of individual sheets are obtained. At least one sheet is perforated along a second line which is so positioned on such sheet that when it is split along the second line an index sheet of predetermined shape is obtained.

14 Claims, 7 Drawing Figures

CONTINUOUS FORMS FOR MAKING INDEXES

BACKGROUND OF THE INVENTION

This invention relates in general to continuous forms and in particular to continuous forms suitable for making indexes.

When a large number of documents are put together in a collection, for example in a binder, index sheets have been used for classifying the documents into different subject categories or other categories useful to the user. The useful information for identifying and classifying the documents is usually provided on index tabs which protrude from the side of the binder so that a user can get to the documents of interest by simply looking at the information on the index tabs and going right to the documents.

Since documents to be classified and arranged into a collection may differ widely in shapes and sizes, no one size and make of index sheets is adequate for use in all situations. Thus, while ordinarily, documents may be letter or legal size so that standard index sheets of letter or legal size may be adequate, such standard index sheets are no larger adequate if the documents to be classified are longer (such as computer printouts or accounting sheets) or smaller (such as index cards). Furthermore standard index sheets have index tabs along a longer side of the sheet. Instead of having the index tabs on the longer side of documents (one of the 11 inch sides of a letter size document), in some circumstances it may be desirable for the index tabs to be on the shorter side of the documents (that is, one of the $8\frac{1}{2}$ inch sides).

Standard index sheets have a fixed number of index tabs that span the length of the sheets, and such number is usually fixed at 5, 6 or 8. The number of tabs in a set of index sheets is known as the tab count. The length of the index sheet on which tabs are provided is known as the bank so that the tab count represents the number of tabs per bank. The number of tabs per bank desired for a particular application may be different from that available from conventional index sheets.

Where standard index sheets cannot be used for a particular application for reasons such as those above, the required index sheets will have to be custom made. Index sheets are frequently custom made in printing and office supply shops. However, custom made index sheets are sometimes required only in small quantities and are therefore frequently given a low priority by printers. The user may have to wait for a lengthy turn around time for custom made index sheets. It is therefore desirable to provide ways by which the end user can make its own index sheets tailored for the particular use intended instead of having to rely on either standard index sheets or index sheets custom made by printing shops.

SUMMARY OF THE INVENTION

A continuous form for making one or more index sheets comprises an elongated strip of material perforated along a first line or a first set of lines transverse to the length of the strip. When the strip is split along the first set of lines a plurality of individual sheets are obtained. At least one sheet is perforated along a second line which is so positioned on such sheet that when it is split along the second line an index sheet of predetermined shape is obtained.

DETAILED DESCRIPTION OF THE PREFERRED EMBODIMENT

Figure 1:
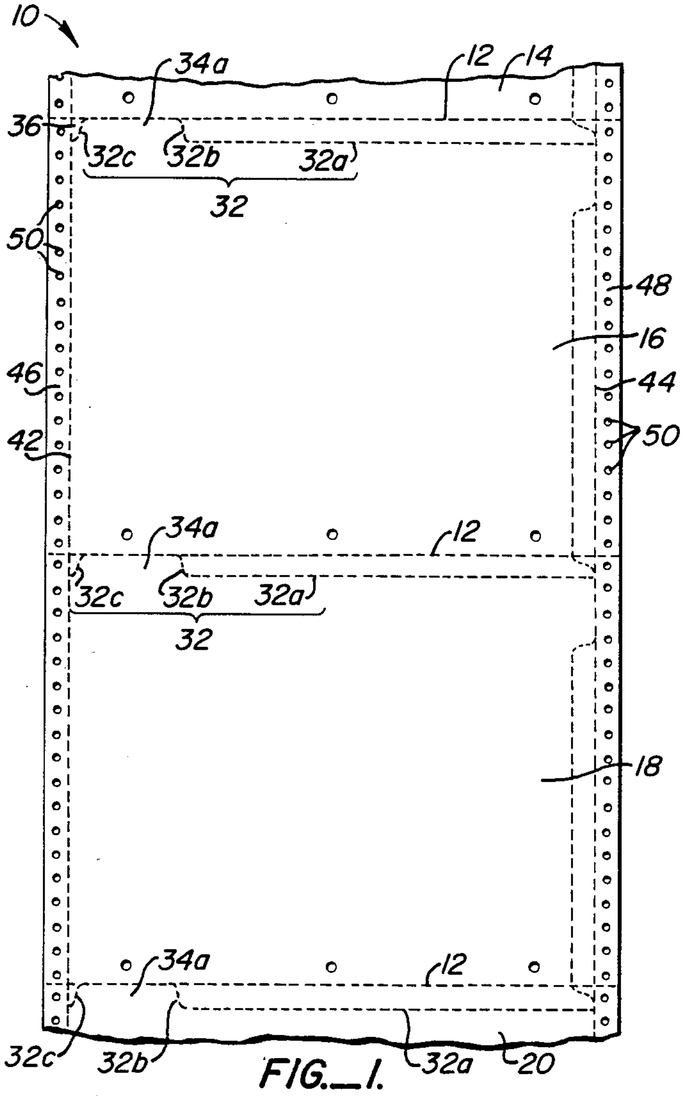
FIG. 1 is a plan view of a section of a continuous form for making index sheets illustrating the preferred embodiment of this invention.

FIG. 1 is a plan view of a section of a continuous form 10 for making index sheets illustrating the preferred embodiment of this invention. As shown in FIG. 1 continous form 10 is an elongated strip of material (such as paper) perforated along a first set of lines 12 transverse to the length of the form. While more than one line 12 is shown in FIG. 1 it will be understood that form 10 may contain fewer lines than as shown, including only one line. All such configurations are within the scope of this invention.

When the form is split along lines 12 a number of individual sheets 14, 16, 18, 20 and so on are obtained. The number of sheets depends on the length of the form and the number of lines 12 present in the continuous form. At least one of the individual sheets is perforated along a second line so that if the sheet is split along the second line, a sheet with an index tab is obtained. In reference to FIG. 1, sheet 16 is perforated along a second line 32 which is so positioned on sheet 16 that when sheet 16 is split along line 32 a sheet with index tab **34*a* is obtained. In the embodiment of FIG. 1, the tab count is 5. In other words, if one of the longer sides of sheet 16 obtained by splitting lines 12 is the bank, five tabs will be provided on such side. As shown in FIG. 1 line 32 comprises three portions: a portion 32*a* which traverses about four-fifths of the width of form 10, a portion 32*b* which connects 32*a* to line 12 and a portion 32*c* which marks off corner 36 of sheet 16. Portions 32*b* and 32*c* are shaped to give the index tab 34 a streamlined look. Portion 32*a* is preferably substantially parallel to line 12 and perpendicular to the length of the continuous form 10. When so shaped, index sheet 16 may then be used for classifying documents of similar size preferably with the edge formed by splitting along portion 32*a* flush with one side of the documents. Tab 34*a* will then protrude from the side of the documents so that identifying and classification information on tab 34*a*** will be readily visible.

In the preferred embodiment continuous form 10 is also provided with two perforations 42, 44 adjacent to and substantially parallel to the edges of the form. The narrow strips 46 and 48 between lines 42 and 44 and the edges of the form are each provided with holes 50 to enable form 10 to be automatically fed through a printer for printing information on tab 34a. Additional information can be printed on index sheet 16 along with information on tab 34a. After such information has been printed portions 46 and 48 can be simply torn off along lines 42, 44 to yield index sheet 16.

Figure 2:
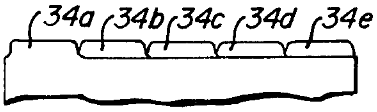
FIG. 2 is a plan view of portions of five index sheets with tabs in different and consecutive positions stacked together to illustrate the preferred embodiment of this invention.

Index sheets 14, 18, 20 can be made in a similar manner, with tabs 34a in substantially the same position as the tab of index sheet 16. If the tab count is five, a complete set of index sheets will contain five types of index sheets, with the index tabs on the five types of sheets in different positions, position 34a illustrated in FIG. 1 being only one of the five positions. The five positions 34a, 34b, 34c, 34d and 34e are shown in FIG. 2, where five index sheets, one from each of the five types of index sheets, have been stacked together with their index tabs appearing consecutively in a row. Except for such difference in the position of the tabs, however, the five types of sheets are the same. Sheets 14–20 have their tabs in position 34a and are all of the same type. To make a complete set, one of the sheets 14–20 is selected and four additional sheets must be made, with their tabs in positions 34b–34e as shown in FIG. 2. The five sheets then form a complete set. Hence a large number of complete sets of index sheets with five tabs can be made by first making a large number of each of the five types of index sheets. The five types of sheets may then be collated to yield numerous complete sets.

One type of sheets, sheets 14–20 is made as described above. To make the four other types of sheets, four additional continuous forms will be necessary for making the four remaining types of sheets with their tabs in position 34b–34e respectively.

Figure 3:
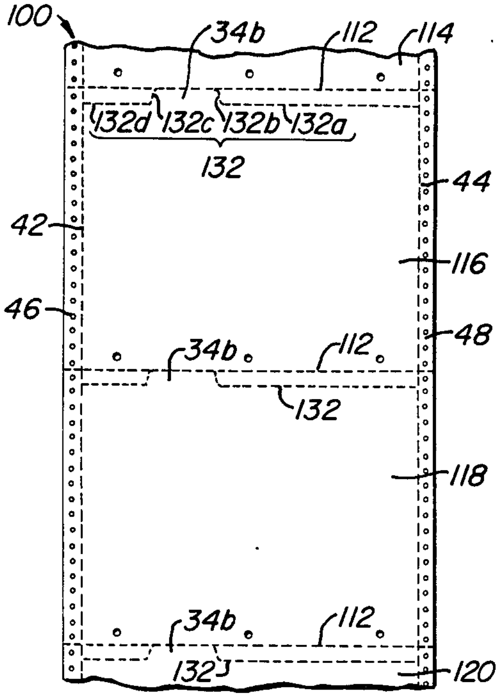
FIG. 3 is a plan view of a section of another continuous form for making index sheets, which, together with the form of FIG. 1, illustrates the preferred embodiment of this invention.

The other four continuous forms are substantially similar to form 10; the only difference being the position of the second lines of perforation for making the tabs (equivalent to line 32 in sheets 14–18). FIG. 3 is a plan view of a continuous form 100 suitable for making index sheets with their tab position at 34b, as shown in FIGS. 2 and 3. Form 100 has perforations along lines 112 similar to lines 12 of form 10. If form 100 is split along lines 112, individual sheets 114–120 and so on are obtained. Like sheets 14–20 of form 10, each individual sheet 114–120 is perforated along a second line 132. If each sheet is split along such second line, index sheets with their tabs at position 34b will result. As shown in FIG. 3, line portion 132a of line 132 is shorter than corresponding portion 32a of line 32 in FIG. 1 by about the length of tab 34a. Compared to the position of portion 32b of FIG. 1, portion 132b of line 132 is shifted to the right by the distance of about the length of tab 34a, and portion 132c is also shifted to the right by the same distance. A portion 132d is substantially the same straight line as portion 132a links portion 132c and line 42. If sheet 116 is split long line 132, an index sheet with its tab in position 34b will result. Sheets 114, 118, 120 with tabs at position 34b may be made in a similar manner.

Three other types of continuous forms are used for making the three other types of index sheets with their tab positions at 34c, 34d and 34e respectively. The three other types of continuous forms also have lines of perforation similar to lines 12 and 112 of FIGS. 1, 3 for making the individual index sheets. The only difference between such three forms and forms 10, 100 is the position of the second line of perforation. The form for making index sheets with tab position at 34c, for example, has the portions of its second line of perforation in its individual sheets corresponding to portions 132b, 132c further shifted to the right by about the length of tab 34b, so that when the sheets are split along their second lines of perforation, index sheets with tabs at position 34c will result. The forms for making index sheets with tab position at 34d and 34e have their portions of the second lines of perforation further shifted to the right in a similar manner.

In the preferred embodiment described above in reference to FIGS. 1, 2, 3, five continuous forms are used to make five types of index sheets which are then collated to make complete sets of index sheets. The preferred embodiment is advantageous where a large number of sets of index sheets are required. Where only a small number of sets are required, it may be advantageous to provide a continuous form which may be used to make all five types of index sheets, with tab positions at 34a–34e, instead of having to use five continuous forms. Such a configuration is described below in an alternative embodiment.

Figure 4:
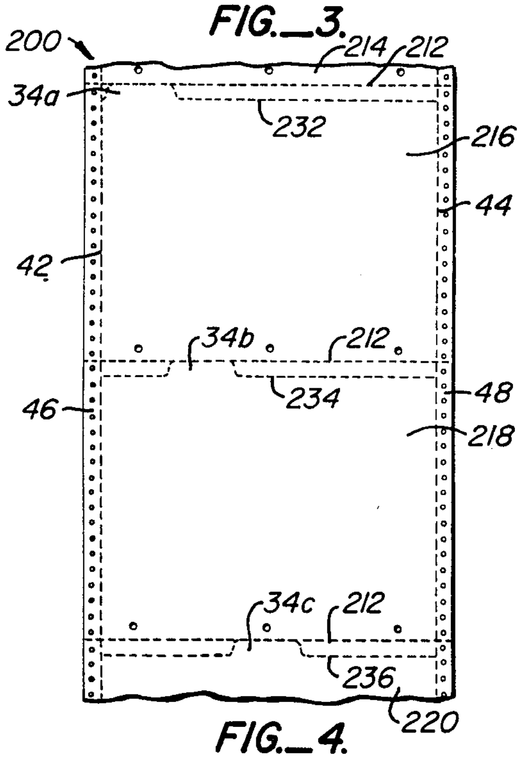
FIG. 4 is a plan view of a section of a continuous form for making index sheets illustrating an alternative embodiment of this invention.

FIG. 4 is a top plan view of a continuous form 200, illustrating an alternative embodiment of the invention. Form 200 have first lines of perforation 212 similar to lines 12 and 112 of the preferred embodiment. When split along lines 212, individual index sheets 214–220 will result. Sheets 214–220 are also perforated along second lines. Line 232 of sheet 216 is in substantially the same position as line 32 of sheets 14–20, so that when sheet 216 is split along line 232, an index sheet with its tab in position 34a will result. Line 234 of sheet 218, however, has its second line of perforation in substantially the same position as lines 132 of sheets 114–120, so that when sheet 218 is split along line 234, an index sheet with its tab in position 34b will result. Similarly when sheet 220 is split along its second line of perforation 236, an index sheet with its tab in position 34c will result. The two sheets that follow sheet 220 have their second lines of perforation in such positions that, when they are split along such lines, index sheets with tab positions at 34d and 34e will result. In such manner, form 200 may be used to make all five types of index sheets for a complete set. Obviously, the form may contain more than five sheets, so that a number of sets of five index sheets can be made from it.

In FIG. 1 a set of index sheets with 5 tabs per bank has been illustrated. It will be understood that if the widths of the tabs are reduced a set of index sheets with more tabs per bank can be made. Similarly by increasing the widths of the tabs, a set of sheets with fewer tabs per bank can be made. In all such configurations the tabs are positioned so that when the sheets are stacked together all the information displayed on the tabs will be visible.

The system described above for making index sheets is particularly advantageous for tailoring the sheets to the particular use intended. Thus, if a continuous form such as forms 10, 100, 200 designed to make index sheets of the right size and shape and the number of tabs per bank is provided, a user can simply feed the form through a printer such as a printer connected to a computer or a word processor. Common word processing or computer techniques can be applied to print desired information on the tabs of index sheets and on other parts of the sheets. After the information has been printed, the narrow strips such as strips 46, 48 can be torn off and the form is split along transverse lines such as lines 12, 112, 212 to yield individual index sheets. Each individual sheet so made is then split along its second line of perforation. A set of index sheets each with tabs and with desired information printed thereon is now available for use.

Figure 5:
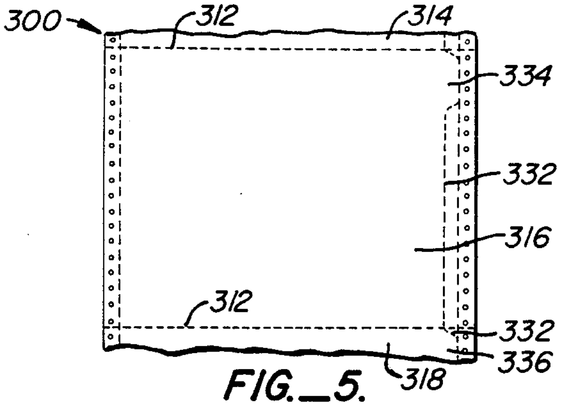
FIG. 5 is a plan view of a section of a continuous form for making index sheets illustrating a different configuration for the positions of index tabs on the index sheets.

The above described technique can be used to make index sheets of any shape and size by selecting continuous forms with the proper dimensions and the desired number of tabs per bank. In reference to FIG. 1, the tabs are located on one of the longer sides of the index sheets. It will be understood, however, that the index tabs may be located on one of the shorter sides instead. Such configuration of tabs is shown as tabs 334 and 336 in FIG. 5. The second lines of perforation 332 of the individual sheets 314–318, instead of being parallel to line 312, will then be substantially parallel to the edges of form 300. Such configuration is within the scope of this invention.

Figure 6:
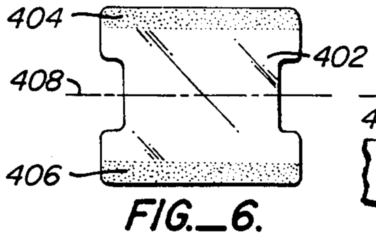
FIGS. 6 and 7 are schematic views of a shield for reinforcing index tabs to illustrate the preferred embodiment of this invention.
Figure 7:
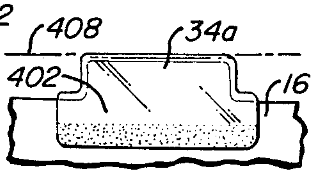

To reinforce flaps 34*a* of FIG. 1, the flaps may preferably be shielded and re-enforced by a stronger material than the material of continuous form 10. FIG. 6 is a schematic view of a shield which may be used for such purpose. As shown in FIG. 6, a celluloid shield 402 with two self-adhesive skirts 404, 406. Shield 402 is folded over along line 408 to enclose flaps 34*a*, until skirts 404, 406 adhere to both sides of sheet 16 as shown in FIG. 7. Flap 34*a* is then protected by shield 402.

The above description of method and the construction used is merely illustrative thereof and various changes in shapes and sizes, materials or other details of the method and construction may be within the scope of the appended claims.

It is claimed:

1. A continuous form for making one or more index sheets comprising an elongated strip of material perforated along a first line or a first set of lines transverse to the length of the strip, so that when the strip is split along the first line or first set of lines, a plurality of individual sheets are obtained, wherein at least one sheet is perforated along a second line which is so positioned on such sheet that when said at least one sheet is split along the second line, an index sheet of predetermined shape is obtained, said second line being adjacent and substantially parallel to one side of such sheet, said second line of perforation traversing the length or width of such sheet except for a predetermined portion, said second line of perforation being connected to such one side by one or more additional lines of perforation near the edges of the portion, so that when such sheet is split along said second line and said additional lines of perforation, an index sheet with said portion forming an index tab will result.

2. The form of claim 1, wherein the strip is perforated along said first set of plurality of lines which are substantially parallel to and evenly spaced from each other, wherein the plurality of individual sheets obtained by splitting the strip along the first set of lines are of similar size and shape.

3. The form of claim 2, said second line being at such distance from said one side for each sheet that when the sheets are stacked in a pile with all sides of the sheets matching, the lines of perforation will at least partly overlap, and when the sheets are so stacked after each sheet has been split along its second and additional lines, the sides of the sheets so formed will match and the index tabs of each sheet will protrude from such sides for displaying information thereon.

4. The form of claim 3, wherein the second line of perforation of each sheet is at such position that the sheets are substantially identical with their index tabs in substantially identical positions.

5. The form of claim 3, wherein the second line of perforation of each sheet is at such position that at least two of said plurality of sheets have their index tabs in different positions.

6. The form of claim 5, wherein the form is suitable for making a complete set of index sheets with n tabs per bank, n being a positive integer, and wherein the second lines and additional lines of perforation of said plurality of sheets are so located that when n selected sheets are split along such lines and then stacked in a pile with the sides formed by the spliting matching, the n tabs will not overlap one another.

7. The form of claim 6, wherein the second and additional lines are so located that said n selected sheets are consecutive on said form, and when said n sheets are stacked in the same order as they appear in the form, the index tab of each sheet is immediately adjacent to the index tabs of the sheet above and the index tab of the sheet below such sheet.

8. The form of claim 2, wherein the form contains n individual sheets and n index tabs, one for each sheet, n being a positive integer.

9. The form of claim 8, wherein n is 5.

10. The form of claim 2, wherein the second lines of perforation of individual sheets are substantially parallel to the first set of lines.

11. The form of claim 2, wherein the second lines of perforation of individual sheets are substantially perpendicular to the first set of lines.

12. The form of claim 1, wherein the strip is perforated along a third and fourth line substantially parallel and adjacent to the edges of the strip, said strip having holes located between its edges and the third and fourth lines so that the form is adapted for automatic feeding through printers.

13. The form of claim 12, wherein the distance between the third and fourth lines is about 11 inches.

14. The form of claim 12 wherein the distance between the third and fourth lines is about 14 inches.

* * * * *